United States Patent
Pillai (10) Patent No.: US 7,502,756 B2
(45) Date of Patent: Mar. 10, 2009

(54) MATCHED FILTER APPROACH TO PORTFOLIO OPTIMIZATION

(76) Inventor: Unnikrishna Sreedharan Pillai, 432 Harriot Ave., Harrington Park, NJ (US) 07640

( * ) Notice: Subject to any disclaimer, the term of this patent is extended or adjusted under 35 U.S.C. 154(b) by 391 days.

(21) Appl. No.: 11/453,370

(22) Filed: Jun. 15, 2006

(65) Prior Publication Data
US 2007/0294191 A1 Dec. 20, 2007

(51) Int. Cl.
*G06Q 40/00* (2006.01)

(52) U.S. Cl. .................................. 705/36 R; 705/35
(58) Field of Classification Search ............. 705/36–40, 705/36 R
See application file for complete search history.

(56) References Cited

U.S. PATENT DOCUMENTS

| | | | |
|---|---|---|---|
| 2003/0055765 A1* | 3/2003 | Bernhardt | 705/36 |
| 2003/0191704 A1* | 10/2003 | Alb | 705/36 |
| 2004/0133490 A1* | 7/2004 | Thompson | 705/35 |
| 2004/0167843 A1* | 8/2004 | French | 705/36 |
| 2004/0181479 A1* | 9/2004 | Zosin et al. | 705/36 |
| 2004/0186803 A1* | 9/2004 | Weber et al. | 705/35 |
| 2005/0033679 A1* | 2/2005 | Rachev et al. | 705/36 |
| 2005/0108134 A1* | 5/2005 | Harlow et al. | 705/36 |
| 2006/0190371 A1* | 8/2006 | Almgren et al. | 705/35 |
| 2006/0195373 A1* | 8/2006 | Flaxer et al. | 705/35 |

OTHER PUBLICATIONS

B. Blog, G. van der Hoek, A.H.G Rinnooy Kan, G.T. Timmer, The Optimal Selection of Small Portfolios (Jul. 1983) Management Science, vol. 29, No. 7, pp. 792-798.*
Marek Capinski and Tomasz Zastawniak, Mathematics for Finance An Introduction to financial Engineering, 99, 91-99, 107-111, Springer Undergraduate Mathematics Series, Springer Verlag, London, 2003.

* cited by examiner

*Primary Examiner*—Mary Cheung
*Assistant Examiner*—Chika Ojiaku
(74) *Attorney, Agent, or Firm*—Walter J. Tencza, Jr.

(57) ABSTRACT

Given a fixed amount of capital, how to invest it optimally by distributing it among a set of stocks and securities so as to maximize the return while minimizing the overall risk is addressed here. Given that one has full freedom in selecting the type of stocks, a new strategy is outlined here by maximizing the ratio of the gain to risk—rather than minimizing the risk alone—to determine the fraction of capital that must go to each stock. An optimum gain versus variance plot can be used to determine the type of stocks to be selected in addition to their relative quantity for maximum yield over the duration of interest. By modifying the definition of risk to include a function of the covariance matrix of secondary stocks that are sympathetic to the primary stocks of interest, an alternate investment strategy is also developed here. If short selling of stocks and securities is not allowed in a portfolio, then stock selection becomes important so as to maintain the desired fractions to be positive. In this context, a new iterative method that incrementally increases the diagonal loading of the covariance matrix of the primary returns so as to achieve positive weight factors is also developed.

19 Claims, 4 Drawing Sheets

MATCHED FILTER APPROACH TO PORTFOLIO OPTIMIZATION

FIELD OF THE INVENTION

This invention relates to methods and apparatus for distributing funds among a set of investments.

BACKGROUND OF THE INVENTION

Suppose one has some capital to invest in the stock market. How does one go about investing it? One can try picking "good" stocks at low prices and selling them later at higher prices. That age old strategy although quite simple conceptually, is very difficult to implement. Stocks are inherently risky since they move up and down in a seemingly haphazard fashion on a variety of inputs and the common wisdom says that one should not keep "all eggs in one basket", but rather spread out the investment so as to minimize the risk.

In the 1950s Harry Markowitz, then a graduate student at the University of Chicago, fine-tuned this idea, laying the foundations of the modern portfolio theory. Markowitz's idea is easy to understand. Let us concentrate on picking stocks. The strategy is to pick the right mix of stocks that minimizes the overall risk in terms of losing money that is invariantly caused by the stock values moving below their purchased prices. Stocks move up and down, sometimes violently, causing great volatility in term of the total portfolio value. Markowitz's basic idea was to keep this volatility low by picking the right mix of stocks. One would like to keep the total portfolio value fluctuations to a minimum at all times, i.e. no big variations, and if there are any variations they should amount to small jitters. Actual stock variations are of course beyond one's control, but what is controllable is which specific stocks to add to the overall portfolio from the total pool, and how much of each stock. The idea is to use the right mix of right stocks to minimize the overall volatility. After all the basic goal of a fund manager is to protect the portfolios under his management from losing their values and hopefully increase their return values or the overall gain. The specific stock holdings and their relative importance within the portfolio are unimportant both to the fund manager and to the investor, so long as the portfolio "makes money", or performs well.

Thus two quantities play a role in portfolio selection—the overall risk, and the overall return or gain. Obviously, the overall risk needs to be minimized, and the overall return or gain should be maximized at the same time. Various strategies can be designed using these conflicting goals.

For a random variable, the variance is a good measure of the spread of the random variable around a mean value, and hence volatility minimization for stocks or investments, can be achieved in terms of portfolio variance minimization.

To quantify these ideas, let P represent an overall portfolio consisting of m stocks where $s_i(n)$ represents the $i^{th}$ stock price at time index n and $a_i>0$ the weight factor associated with the $i^{th}$ stock. Note that the unit of time can be hours, days, months or years depending on the investment duration. Clearly $$a_i > 0, \sum_{i=1}^{m} a_i = 1 \tag{1}$$

and the $a_i$s are unknown to start with.

If $C_o$ represents the total capital, then $C_o a_i$ represents the capital invested in the $i^{th}$ stock so that $C_o a_i/s_i(0) = k_i$ represents the actual number of the $i^{th}$ stock in the portfolio. Hence the portfolio value at time index n equals to $$\sum_{i=1}^{m} k_i s_i(n)$$

and hence the portfolio return over duration (0, n) equals $$\begin{aligned} P &= \sum_{i=1}^{m} k_i s_i(n) - C_o \\ &= C_o \sum_{i=1}^{m} a_i \frac{s_i(n) - s_i(0)}{s_i(0)} \\ &= C_o \sum_{i=1}^{m} a_i r_i(n) \end{aligned} \tag{2}$$

where $$r_i(n) = \frac{s_i(n) - s_i(0)}{s_i(0)} \tag{3}$$

represents the $i^{th}$ stock return over the duration (0, n). Thus for portfolio return analysis, the important variable is the stock return value $r_i(n)$ rather than the actual stock value $s_i(n)$ itself. Let $$\mu_i = E\{r_i(n)\} \tag{4}$$

represent the mean value (expected value) of the $i^{th}$ stock return (see, in "Probability, Random Variables and Stochastic Processes," Fourth Edition, A. Papoulis, and S. U. Pillai, McGraw-Hill Companies, New York, USA, 2001). The mean value $\mu_i$ can also be a good indicator about the future trend, where one hopes the stock will be based on company performance and other related parameters. One may need to predict $\mu_i$ based on all available data. The stock return values move around their mean values, the individual variations depending on the individual variance and related cross-correlations among other stocks.

The expected value of the portfolio return represents the net gain G of the portfolio. Thus the overall gain of the portfolio in (2) is given by ($C_o = 1$)

$$G = E\{P\} = E\left\{\sum_{i=1}^{m} a_i r_i(n)\right\} = \sum_{i=1}^{m} a_i \mu_i = \underline{a}^T \underline{\mu} \tag{5}$$

where $$\underline{a} = [a_1, a_2, a_3, \ldots a_m]^T \tag{6}$$

$$\underline{r}(n) = [r_1(n), r_2(n), r_3(n), \ldots r_m(n)]^T \tag{7}$$

and $$\underline{\mu} = E\{\underline{r}(n)\} = [\mu_1, \mu_2, \mu_3, \ldots \mu_m]^T. \tag{8}$$

Here $E\{.\}$ stands for the expected or ensemble averaging operation as in (4). The overall risk of the portfolio is given by the variance of the portfolio return that equals $$\sigma_P^2 = E\{[P - E\{P\}]^2\} \quad (9)$$
$$= E\{\underline{a}^T[\underline{r}(n) - \underline{\mu}][\underline{r}(n) - \underline{\mu}]^T \underline{a}\}$$
$$= \underline{a}^T E\{[\underline{r}(n) - \underline{\mu}][\underline{r}(n) - \underline{\mu}]^T\}\underline{a}$$
$$= \underline{a}^T R \underline{a}$$

where (see, in "Probability, Random Variables and Stochastic Processes," Fourth Edition, A. Papoulis, and S. U. Pillai, McGraw-Hill Companies, New York, USA, 2001).

$$R = E\{[\underline{r}(n) - \underline{\mu}][\underline{r}(n) - \underline{\mu}]^T\} > 0 \quad (10)$$

represents the covariance matrix (positive definite matrix) of the stock return vector $\underline{r}(n)$. Notice that $$R_{ii} = E\{(r_i(n) - \mu_i)^2\} = \text{var}\{r_i(n)\} = \sigma_i^2 > 0 \quad (11)$$

represents the variance of the $i^{th}$ stock return, and $$R_{ij} = E\{(r_i(n) - \mu_i)(r_j(n) - \mu_j)\} = \text{cov}\{r_i(n), r_j(n)\} = \rho_{ij}\sigma_i\sigma_j \quad (12)$$

represents the covariance between returns $r_i(n)$ and $r_j(n)$, where $\rho_{ij}$ is defined as the correlation coefficient between $r_i(n)$ and $r_j(n)$.

The above equations are well known in the prior art. In addition, the above equations have been used to formulate the following portfolio optimization strategy, which can be called "Prior Art: Minimize Portfolio Risk".

Prior Art: Minimize Portfolio Risk:

Find the right max of stocks that minimizes the overall portfolio risk. Take whatever profit you get.

In the "Minimize Portfolio Risk" approach, the Portfolio risk is minimized by minimizing the portfolio variance $\sigma_P^2$ in equation (9) subject to the constraints in equation (1). This gives the well-known constrained optimization problem referred to in "Mean-Variance Analysis in Portfolio Choice and Capital Markets", H. M. Markowitz, et. al., John Willy, New York, 2000:

$$\min \underline{a}^T R \underline{a} \text{ subject to } \underline{a}^T \underline{e} = 1 \quad (13)$$

where $\underline{e}$ represents the "all ones" column vector $$\underline{e} = [1, 1, 1, \ldots, \ldots, 1]^T \quad (14)$$

Notice that the nonnegative constraint for $\underline{a}$ needs to be incorporated as well. One approach of the prior art is to use the simplex type optimization methods to incorporate the positivity constraint for the weight vector $\underline{a}$ as referred to in "Mean-Variance Analysis in Portfolio Choice and Capital Markets", H. M. Markowitz, et. al. Another approach is to put additional constraints on stock selection to realize this goal.

Eq. (13) leads to the modified Lagrangian function $$\min \Lambda = \underline{a}^T R \underline{a} + \lambda(\underline{a}^T \underline{e} - 1) \quad (15)$$

and its minimization yields $$\frac{\partial \Lambda}{\partial \underline{a}} = 2R\underline{a} + \lambda \underline{e} = 0 \quad (16)$$

which gives $$\underline{a} = -\frac{\lambda}{2} R^{-1} \underline{e} \quad (17)$$

and the normalization condition $$\underline{a}^T \underline{e} = 1 \Rightarrow -\frac{\lambda}{2} = \frac{1}{\underline{e}^T R^{-1} \underline{e}}$$

or $$\underline{a} = \frac{R^{-1} \underline{e}}{\underline{e}^T R^{-1} \underline{e}} > 0. \quad (18)$$

Observe that (18) must turn out to be a positive vector. This is clearly satisfied if $R^{-1}$ is a positive (Perron) matrix as specified in the prior art in "Matrix Algebra and Its Applications for Statistics and Econometrics", C. R. Rao, M. B. Rao, Singapore,: World Scientific, 1998. Thus if $R^{-1}$ is a positive definite matrix, then the optimum vector a turns out to be positive since the denominator $\underline{e}^T R^{-1} \underline{e} > 0$.

In other words, to start with one may select only those stocks to be in the portfolio for which $R^{-1}$ satisfies the Perron property (positive matrix). In that case, the minimum volatility is given by:

$$(\sigma_P^2)_{\min} = \underline{a}^T R^{-1} \underline{a} = \frac{1}{\underline{e}^T R^{-1} \underline{e}} = \frac{1}{\sum_i \sum_j R^{ij}} > 0. \quad (19)$$

where $R^{ij}$ represents the (i,j)-th entry of the matrix $R^{-1}$.

Also, the net gain in that case is given by $$G = \underline{a}^T \underline{\mu} = \frac{\underline{e}^T R^{-1} \underline{\mu}}{\underline{e}^T R^{-1} \underline{e}} > 0. \quad (20)$$

For example, in a two-stock portfolio, the Perron property that $R^{-1}$ contain only positive entries is satisfied by any two negatively correlated stocks since in that case $$R = \begin{pmatrix} 1 & -\rho \\ -\rho & 1 \end{pmatrix}, 0 < \rho < 1 \quad (21)$$

and $$R^{-1} = \frac{1}{1 - \rho^2} \begin{pmatrix} 1 & \rho \\ \rho & 1 \end{pmatrix} > 0 \quad (22)$$

has all positive entries. Observe that equation (21) represents the covariance matrix of two stock returns with "opposing trends" and they are negatively correlated. Hence when one "goes up", the tendency of the other one is to "go down" thus minimizing the risk of loss. For large m, realizing this non-negativity condition may be too restrictive. From equation (18), a more relaxed condition is that the row sums of $R^{-1}$ must be all positive.

From time-to-time, the portfolio manager should recompute R and update the portfolio mix vector $\underline{a}$ by buying/selling stocks to keep the overall portfolio volatility low.

SUMMARY OF THE INVENTION

At least one embodiment of the present invention provides a method and an apparatus for investing a fixed amount of capital optimally by distributing it among a set of stocks and securities so as to maximize the return while minimizing the overall risk. In at least one embodiment a gain to risk ratio is maximized rather than minimizing the risk alone, to determine the fraction of capital that must go to each stock. If short selling stocks and securities is not allowed in a portfolio, then stock selection becomes important so as to maintain the desired fractions to be positive. An optimum gain versus variance plot can be used to determine the type of stocks to be selected in addition to their relative quantity for maximum yield over the duration of interest. By modifying the definition of risk to include some function of the covariance matrix of secondary stocks that are sympathetic to the primary stocks of interest, an alternate investment strategy is also developed here.

At least one embodiment of the present invention includes a method comprising determining a first and second return values for a first stock, and determining a mean return value for the first stock based on the first and second return values. The method further includes determining a first and second return values for a second stock, and determining a mean return value for the second stock based on the first and second return values for the second stock. The method may further include determining an inverse co-variance matrix based on the first and second return values for the first stock, the mean return value for the first stock, the first and second return values for the second stock, and the mean return value for the second stock. The method may also include determining weighting factors for the first and second stocks, respectively, by multiplying the inverse co-variance matrix times the mean return values for the first and second stocks, and normalizing the result by dividing it with their sum. The method may also include specifying an amount of the first stock for purchasing based on the first factor of the weight factor and specifying an amount of the second stock for purchasing based on the second factor of the weight factor.

The method may further be comprised of determining a vector of a plurality of weight factors $\underline{a}_{opt}$ including the first and second weight factors, and determining a vector $\mu$ of a plurality of mean return values including the mean return values for the first and second stocks. The plurality of weight factors may be given by $\underline{a}_{opt} = kR^{-1}\underline{\mu}$, wherein k is a normalization constant so that the entries of the optimum vector add up to unity, and $R^{-1}$ is the inverse co-variance matrix. The quantity k may be given by $$k = \frac{1}{\underline{e}^T R^{-1} \underline{\mu}}.$$

and $\underline{e}^T$ is an all ones row vector.

The present invention, in one or more embodiments also includes a method for investing a given capital sum by distributing it among a set of investments. The method may include determining a plurality of weight factors, one for each investment in the set of investments by which the capital sum will be partitioned so as to determine an actual amount to be invested in each investment. The plurality of weight factors may be determined by maximizing a total gain to overall risk ratio. Alternatively, the plurality of weight factors may be determined by maximizing a square of a total gain to overall risk ratio. A first numerical filter may be used to un-correlate a primary or first set of investments and a second numerical filter may be used to maximally combine the primary or first set of investments.

In at least one embodiment of the present invention a vector of weighting factors $\underline{a}_{opt}$ for the primary set of investments is determined from the below fraction:

$$\underline{a}_{opt} = \frac{R^{-1}\underline{\mu}}{\underline{e}^T R^{-1} \underline{\mu}} \quad (23)$$

wherein $R^{-1}$ is the inverse of the covariance matrix for the primary set of investments, $\mu$ is the expected mean returns vector for the primary set of investments, and $\underline{e}^T$ is an all ones row vector.

The present invention in one or more embodiments may include maximizing the ratio of the square of an expected investment portfolio gain of a primary or first set of investments to a modified risk. The modified risk may be defined as the sum of the portfolio risk based on the primary set of investments and a function of a covariance matrix of a secondary set of stocks that are sympathetic to the set of primary investments.

The present invention, in one or more embodiments may include a method comprising selecting a primary set of investments, and selecting a secondary set of investments, which are related to the primary set of investments. The method may also include determining returns for the primary set of investments, determining returns for the secondary set of investments, and determining an expected mean returns vector for the primary set of investments. The method may further include determining a covariance matrix for the primary set of investments, and modifying the covariance matrix for the primary set of investments by adding a diagonal matrix generated from a covariance matrix for the secondary set of investments. The method may also include determining weighting factors a for investing in the primary set of investments iteratively from the below fraction:

$$\underline{a}_{k+1} = \frac{\left(R + \frac{\sigma_0^2}{\|\underline{a}_k\|^2} I\right)^{-1} \underline{\mu}}{\underline{e}^T \left(R + \frac{\sigma_0^2}{\|\underline{a}_k\|^2} I\right)^{-1} \underline{\mu}}. \quad (24)$$

wherein R is the covariance matrix for the primary set of investments, $\mu$ is the expected mean returns vector for the primary set of investments, $\underline{e}^T$ is an all ones row vector; $\sigma_o^2$ is the sum of the variances of the secondary stocks that influence the primary stocks that is obtained by summing the diagonal entries of the covariance matrix of the secondary set of investments. Here $\|\underline{a}_k\|^2 = \underline{a}_k^T \underline{a}_k > 0$ represents the square of the norm of the vector $\underline{a}_k$, and I represents the m×m identity matrix (with ones along the main diagonal and zeros elsewhere). In at least one embodiment of the present invention, the constant term $\sigma_o^2$ above may also be treated as a free positive variable and increased in numerical value until the vector of weighting factors for the primary set of investments turns out to be positive.

The primary or first set of investments may include any investment, such as a stock, security, mutual fund, hedge fund, or index following fund, and they may be selected so that the above weight factor vector turns out to be positive.

DETAILED DESCRIPTION OF THE DRAWINGS

One embodiment of the present invention makes use of matched filtering concepts for the purpose of picking stocks. These matched filtering concepts were previously used in the field of electrical engineering but were not previously used for the purpose of picking the right mix of stocks in a portfolio.

At least one embodiment of the present invention provides a method for picking stocks, which maximizes gain and simultaneously minimizes risk. This is achieved by maximizing the ratio of gain to risk. The right mix of stocks are selected so as to maximize the gain G while simultaneously minimizing the overall risk $\sigma_P^2$. In at least one embodiment the following ratio is maximized:

$$\frac{G}{\sigma_P^2}. \quad (25)$$

Equation (25) represents the gain over the portfolio risk. However, in one embodiment of the present invention, instead of maximizing (25), the following ratio is maximized:

$$\frac{G^2}{\sigma_P^2} = \frac{|\underline{a}^T \underline{\mu}|^2}{\underline{a}^T R \underline{a}} \quad (26)$$

subject to the normalization constraint $\underline{a}^T \underline{e} = 1$.

Strategy-1 (in Accordance with an Embodiment of the Present Invention):

Clearly, equation (26) represents a more aggressive strategy in term of maximizing gain, but more interestingly, the ratio in equation (26) is the same as the familiar SNR (Signal to Noise Ratio) maximization strategy used in classical receiver design in Communication theory, in Electrical Engineering, where a signal corrupted by interference and noise is presented to a receiver to minimize the effect of output interference plus noise while maximizing the output signal component at the decision instant as referred to in "Signals Analysis", A. Papoulis, McGraw-Hill Companies, New York, USA, 1977, and also "Digital Communications", Fourth edition, J. Proakis, McGraw-Hill Companies, New York, USA, 2001.

The solution to the SNR maximization problem leads to well known matched filter (MF) solution as referred to in "Signals Analysis", A. Papoulis.

From (26), with $$SNR = \frac{G^2}{\sigma_P^2},$$

we get $$SNR_{max} = \left(\frac{G^2}{\sigma_P^2}\right)_{max} = \max_{\underline{a}} \frac{|\underline{a}^T \underline{\mu}|^2}{\underline{a}^T R \underline{a}} \leq \underline{\mu}^T R^{-1} \underline{\mu} \quad (27)$$

since by Schwarz's inequality $$|\underline{a}^T \underline{\mu}|^2 = |(R^{1/2}\underline{a})^T (R^{-1/2}\underline{\mu})|^2 \leq (\underline{a}^T R \underline{a})(\underline{\mu}^T R^{-1} \underline{\mu}), \quad (28)$$

With equality if $$\underline{a}_{opt} = kR^{-1}\underline{\mu}. \quad (29)$$

This gives $$SNR_{max} = \left(\frac{G^2}{\sigma_P^2}\right)_{max} = \underline{\mu}^T R^{-1} \underline{\mu}. \quad (30)$$

In general the entries of the optimum portfolio mix vector shown in equation (29) can be both positive or negative. Negative entries indicate that the corresponding stock is to be shorted. If short sale strategies are prohibited, for example, as in the case of most of mutual funds, then one needs to maintain $\underline{a} > 0$, and in that case one can perform a constrained optimization strategy of maximizing equation (26) subject to the non-negativity constraint of $\underline{a}$. This leads to a suboptimum solution with all positive or non-negative entries for the vector $\underline{a}$ that requires no short selling. This strategy can be applied to any given set of stocks and securities that the investor has a-priori selected. In that case the capital will be partitioned according to the entries of the suboptimum vector so obtained and invested in the corresponding stocks.

An alternate strategy is to keep the pool of the desired stocks and securities to be selected as potentially open, and select them from a larger pool of stocks and securities in such a way that the inverse of their covariance matrix $R^{-1}$ turns out to be a positive matrix. If this condition turns out to be too restrictive or severe especially for a portfolio containing a large number of stocks, one can also settle for the less restrictive new condition $$R^{-1}\underline{\mu} > 0 \quad (31)$$

by
  (i) the judicious selection of stocks that go into the portfolio and by
  (ii) the choice of $\underline{\mu}$ vector in (29) that represent the expected average return.

Observe that $$a^T \underline{e} = \sum_i a_i = 1$$

can be easily maintained with the constant k in equation (29) chosen to be $$k = \frac{1}{\underline{e}^T R^{-1} \underline{\mu}}. \quad (32)$$

This gives the desired portfolio mixing vector to be $$\underline{a}_{opt} = \frac{R^{-1} \underline{\mu}}{\underline{e}^T R^{-1} \underline{\mu}} \quad (33)$$

that maximizes the gain and minimizes volatility. In this case, $$G_{opt} = \underline{a}^T \underline{\mu} = \frac{\underline{\mu}^T R^{-1} \underline{\mu}}{\underline{e}^T R^{-1} \underline{\mu}} > 0 \quad (34)$$

and $$(\sigma_P^2)_{min} = \frac{\underline{\mu}^T R^{-1} \underline{\mu}}{(\underline{e}^T R^{-1} \underline{\mu})^2} > 0. \quad (35)$$

Figure 1:
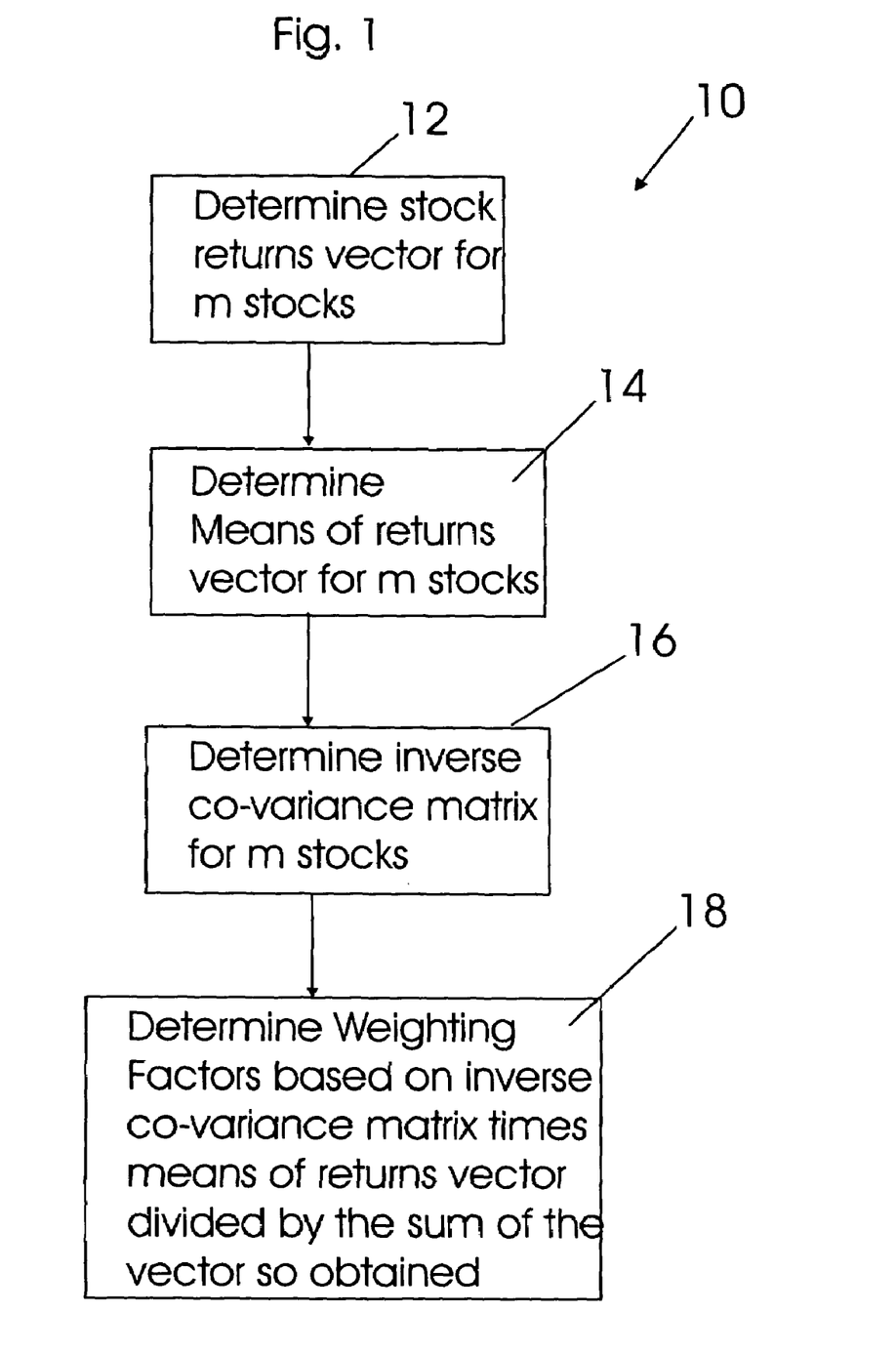
FIG. 1 shows a flow chart of a method in accordance with an embodiment of the present invention.

FIG. 1 shows a flow chart 10 of a method in accordance with an embodiment of the present invention. At step 12, a stock returns vector, such as $\underline{r}(n)$ calculated by equation (3) and (7), is determined for m stocks. Next a means of returns vector, such as $\underline{\mu}$ calculated by equation (4) and (8), is determined at step 14. At step 16, an inverse matrix of m stocks, such as $R^{-1}$ is determined. At step 18 weighting factors, such as $\underline{a}$ are determined based on the inverse co-variance matrix times the means for returns vectors divided by the sum of the vector so obtained, such as by the equation (29) or (33).

Figure 2:
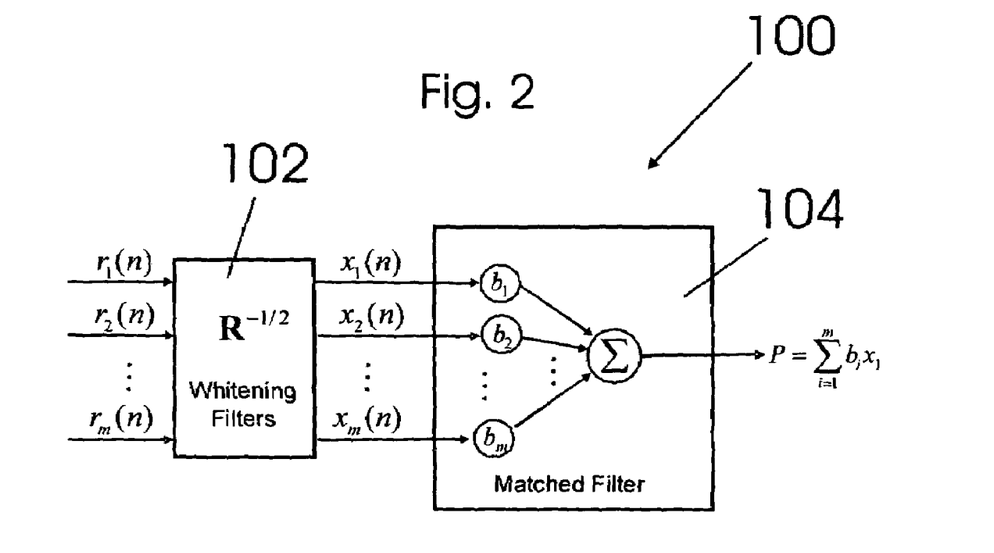
FIG. 2 shows a diagram of a whitening filter followed by a matched filter.

Equation (33) can be given the whitening followed by matched filtering interpretation as well, as will be shown with reference to FIG. 2. FIG. 2 shows a diagram 100 of a whitening filter 102 followed by a matching filter 104. This technique was previously used in classical receiver design in Communication theory in Electrical Engineering, but not for the purpose of picking the right mix of stocks in a portfolio. In this example, the input to the whitening filter 102 is stock returns vector $\underline{r}(n)$. The whitening filter 102 reduces the noise or volatility in the stock returns vector $\underline{r}(n)$ and produces the filter output shown below:

$$\underline{x}(n) = \begin{bmatrix} x_1(n) \\ x_2(n) \\ \vdots \\ x_m(n) \end{bmatrix} = R^{-1/2} \underline{r}(n) \quad (36)$$

The filter output above is uncorrelated and has unit variance since its covariance matrix equals $$R_x = E\{(\underline{x}(n) - E\{\underline{x}(n)\})(\underline{x}(n) - E\{\underline{x}(n)\})^T\} \quad (37)$$
$$= R^{-1/2} E\{(\underline{r}(n) - E\{\underline{r}(n)\})(\underline{r}(n) - E\{\underline{r}(n)\})^T\} R^{-1/2}$$
$$= R^{-1/2} R R^{-1/2} = I$$

and to maximally combine these outputs, the coefficients $\{b_i\}$ in FIG. 2 must be selected so as to maximize the average portfolio gain $$G = E\{P\} = E\left\{\sum_i b_i x_i(n)\right\} = \underline{b}^T \underline{\mu}_x \quad (38)$$

where $$\underline{\mu}_x = E\{\underline{x}(n)\} = R^{-1/2} \underline{\mu}. \quad (39)$$

From Schwarz's inequality (see (28)), Eq. (38) is maximized if $$\underline{b} = k \underline{\mu}_x = k R^{-1/2} \underline{\mu}. \quad (40)$$

Thus $\underline{b}$ in (40) is a maximal combiner with respect to $\underline{\mu}_x$. Hence, $$G = \underline{b}^T \underline{\mu}_x = k \underline{\mu}^T R^{-1/2} \underline{\mu}_x = k \underline{\mu}^T R^{-1/2} R^{-1/2} \underline{\mu} = \underline{a}^T \underline{\mu} \quad (41)$$

or $$\underline{a} = k R^{-1} \underline{\mu} \quad (42)$$

as in equation (29).

Interestingly, Equations (33)-(35) can be used to generate a gain-risk plot by varying over all sustainable $\underline{\mu}$s. Following equation (33), an arbitrary $\underline{\mu}$ is said to be sustainable if $R^{-1} \underline{\mu}$ is a positive vector. Using a sustainable $\underline{\mu}$, one can compute the optimum gain and $\sigma_P$ using equations (34)-(35).

Figure 3:
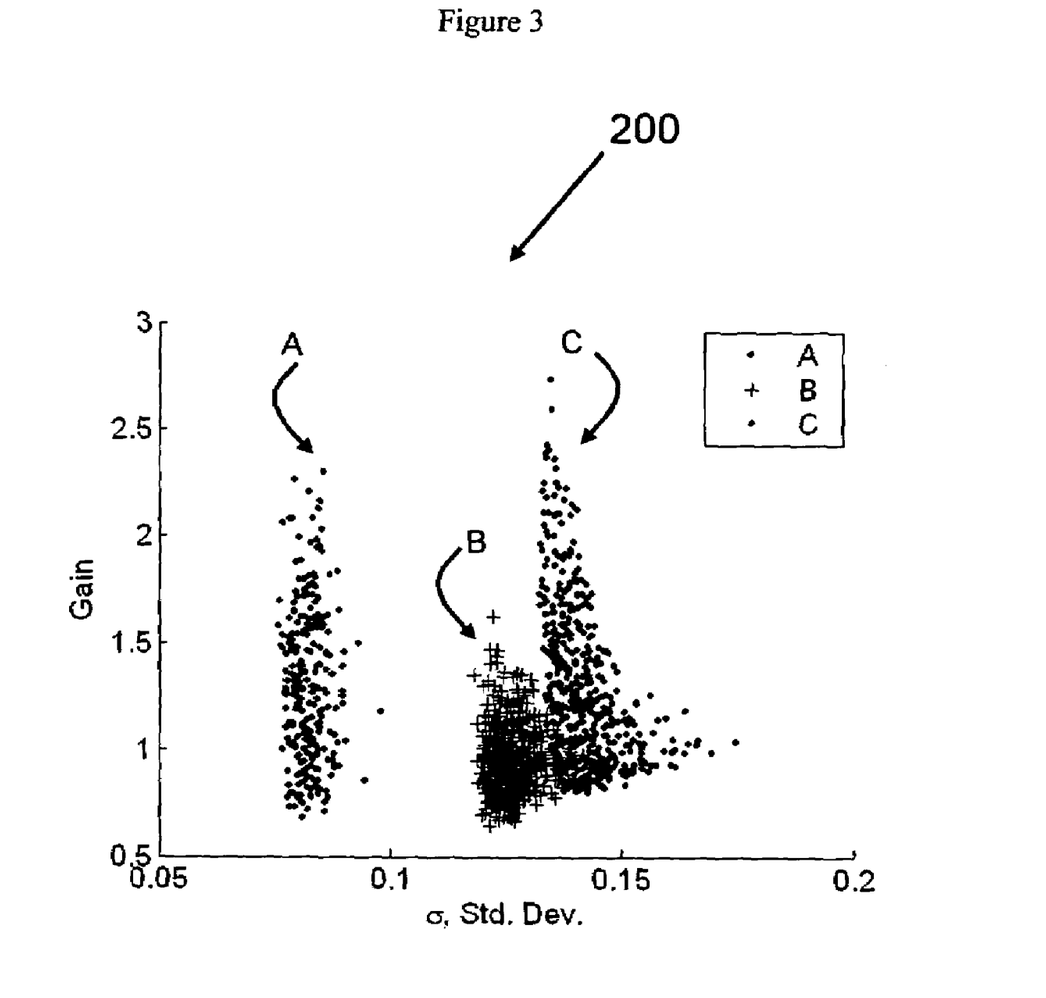
FIG. 3 is a chart showing gain versus square root of portfolio variance (standard deviation)

Notice that although scaling $\underline{\mu}$ does not affect the variance in equation (35), it does affect the gain in equation (34). Hence to avoid duplication by simple scaling, the first entry $\mu_1$ in a sustainable $\underline{\mu}$ may be normalized to unity. As an example, FIG. 3 shows a diagram 200 of an optimum average portfolio gain G as in (34) versus square root of the risk in (32) (standard deviation) plot using arbitrary sustainable normalized mean vectors for various sets of portfolios containing different numbers of actual stocks. The stocks in each portfolio are selected for illustrative purposes only. Table 1 lists the actual stocks used for FIG. 3. Observe that FIG. 3 shows cases for portfolios where the number of stocks equals m=12, 8 and 6. The results for cases m=12, m=8, and m=6 is shown as A, B, and C, respectively in FIG. 3. Covariance matrices in each case have been calculated using sample data collected for the period of January 2001 to December 2004 with weekly duration representing a time unit.

TABLE 1

Stock symbols used in FIG. 3.

| m = 12 | m = 8 | m = 6 |
|--------|-------|-------|
| 'SLB'  | 'TWX' | 'NOC' |
| 'BK'   | 'COST'| 'BAC' |
| 'GD'   | 'SBUX'| 'SBUX'|

TABLE 1-continued

Stock symbols used in FIG. 3.

| m = 12 | m = 8 | m = 6 |
|---|---|---|
| 'SBUX' | 'MER' | 'AAPL' |
| 'TWX' | 'NOC' | 'GE' |
| 'Dell' | 'AAPL' | 'GD' |
| 'NOC' | 'AFL' | |
| 'CFC' | 'DST' | |
| 'BA' | | |
| 'GIS' | | |
| 'EBAY' | | |
| 'MHP' | | |

From FIG. 3, as the number of stocks in a portfolio increases, the risk in terms of overall variance decreases. Interestingly, for the strategy of stock weight picking shown by equations (29) or (33), for a given set of stocks, the risk is more concentrated compared to the spread in gain. Each point in FIG. 3 corresponds to a positive weight vector that is optimum for the corresponding normalized mean vector and the given stocks. The desired gain and risk tolerance of the investor will dictate the actual point of interest that will be selected for investment.

Interestingly, other variations of the stock picking strategy shown by equations (29) and (33) also lead to the same result.

One may use a less aggressive strategy in terms of returns while maintaining low volatility. Then we may maximize:

$$\frac{G}{\sigma_P^2} = \frac{\underline{a}^T \underline{\mu}}{\underline{a}^T R \underline{a}} \quad (43)$$

instead of equation (26). This leads to $$\max_{\underline{a}} \frac{\underline{a}^T R^{1/2} R^{-1/2} \underline{\mu}}{\underline{a}^T R \underline{a}} \leq \sqrt{\frac{\underline{\mu}^T R^{-1} \underline{\mu}}{\underline{a}^T R \underline{a}}}. \quad (44)$$

Equality is achieved by solution given by equation (33) and in that case $$\left(\frac{G}{\sigma_P^2}\right)_{max} = |\underline{\mu}^T R^{-1} \underline{\mu}|^2. \quad (45)$$

On the other hand, one can use a much more aggressive strategy such as maximizing $$\max_{\underline{a}} \frac{G^4}{\sigma_P^2} = \frac{|\underline{a}^T \underline{\mu}|^4}{\underline{a}^T R \underline{a}} \quad (46)$$

subject to equation (1).

Notice that equation (46) is weighted more towards higher gains.

$$\max_{\underline{a}} \frac{G^4}{\sigma_P^2} \leq \frac{|(\underline{a}^T R \underline{a})(\underline{\mu}^T R^{-1} \underline{\mu})|^2}{\underline{a}^T R \underline{a}} = \underline{a}^T R \underline{a}(\underline{\mu}^T R^{-1} \underline{\mu})^2. \quad (47)$$

Once again, equality is obtained in equation (47) by solution given by equation (33).

In summary, for a variety of optimization strategies, the new portfolio mixing vector in equation (33) represents the optimum strategy for building a portfolio. If short selling stocks is allowed, the above strategy can be applied to any set of stocks; if short selling is not permitted, then the selection of stocks and their number that goes into the actual portfolio becomes important and it must be accomplished so as to maintain the desired portfolio mixing vector to be positive, while maintaining a high yield (gain) with minimum fluctuations (risk).

Strategy-2 (in Accordance with Another Embodiment of the Present Invention):

In another embodiment of the present invention, a variation of the maximization of the gain to the risk strategy, to be described below, leads to a somewhat different result in terms of the desired portfolio vector. In the previous method, the risk is defined as the variance of the portfolio under consideration as in equation (9). In a method in accordance with an alternative embodiment of the present invention, this definition is extended as follows:

The actual stocks and securities that go into a portfolio as the primary stocks are identified, and equation (7) represents their returns. In that case the risk defined as in equation (9) represents the variance of the exact combination of the returns of these primary stocks that make up the portfolio. The method next includes identifying through market research and other means another set of stocks as secondary or sympathetic stocks that are correlated to these primary stocks in equation (7). Let $R_0$ represent the covariance matrix of the returns of these secondary stocks that is also defined similar to equation (10). Since the secondary stocks have some influence on the behavior of the primary stocks, the argument here is that their covariance matrix $R_0$ must also contribute to the overall risk of the portfolio. Thus in this approach, a scalar function of $R_0$ is added to the primary risk factor in equation (9). In our case, the trace of $R_0$ (sum of the diagonal entries of the covariance matrix $R_0$) of the secondary returns is used as the scalar function. This gives the modified risk of the portfolio to be $$\sigma_P^2 = \underline{a}^T R \underline{a} + \sigma_o^2 \quad (48)$$

where $$\sigma_o^2 = tr(R_0) \quad (49)$$

represents the trace of $R_0$. In this case the optimization problem in equation (26) gets modified as $$\frac{G^2}{\sigma_P^2} = \frac{|\underline{a}^T \underline{\mu}|^2}{\underline{a}^T R \underline{a} + \sigma_0^2}. \quad (50)$$

Let the vector $\underline{a}_0$ represent the optimum nonnegative vector (constrained optimization using the non-negativity condition) that maximizes the ratio in equation (50) and whose elements add up to unity. In this approach, the capital will be partitioned according to the entries of this new vector $\underline{a}_0$ and invested in the primary stocks.

The nonnegative vector $\underline{a}_0$ above represents a suboptimum solution, and as in equations (26)-(33) there exists an unconstrained (without the nonnegative condition) optimum vector $\underline{b}_{opt}$ that maximizes equation (50), and once again the capital can be partitioned according to the entries of the vector $\underline{b}_{opt}$ and invested in the primary stocks. In this case the strategy can include short sales as well.

The globally optimum vector $\underline{b}_{opt}$ may be solved by noticing that (50) can be rewritten as $$\frac{G^2}{\sigma_P^2} = \frac{|\underline{a}^T \underline{\mu}|^2}{\underline{a}^T \left(R + \frac{\sigma_0^2}{\|\underline{a}\|^2} I\right) \underline{a}}, \quad (51)$$

where I represents the m×m identity matrix (with ones along the main diagonal and zeros elsewhere), and $$\|\underline{a}\|^2 = \underline{a}^T \underline{a} > 0 \quad (52)$$

represents the norm (square of the length) of the vector $\underline{a}$. In (51), proceeding as in (27) through (29), we obtain the following solution $$\underline{a} = c\left(R + \frac{\sigma_0^2}{\|\underline{a}\|^2} I\right)^{-1} \underline{\mu} \quad (53)$$

(where c is a normalization constant) that suggest the iteration $$\underline{a}_{k+1} = c\left(R + \frac{\sigma_0^2}{\|\underline{a}_k\|^2} I\right)^{-1} \underline{\mu}. \quad (54)$$

After normalizing (54) as in equations (32)-(33) so that its entries add up to unity, we obtain the desired iteration to be $$\underline{a}_{k+1} = \frac{\left(R + \frac{\sigma_0^2}{\|\underline{a}_k\|^2} I\right)^{-1} \underline{\mu}}{\underline{e}^T \left(R + \frac{\sigma_0^2}{\|\underline{a}_k\|^2} I\right)^{-1} \underline{\mu}}. \quad (55)$$

that can be used to solve for the above optimum vector $\underline{b}_{opt}$. The above iteration is seen to converge in a variety of situations.

Figure 4:
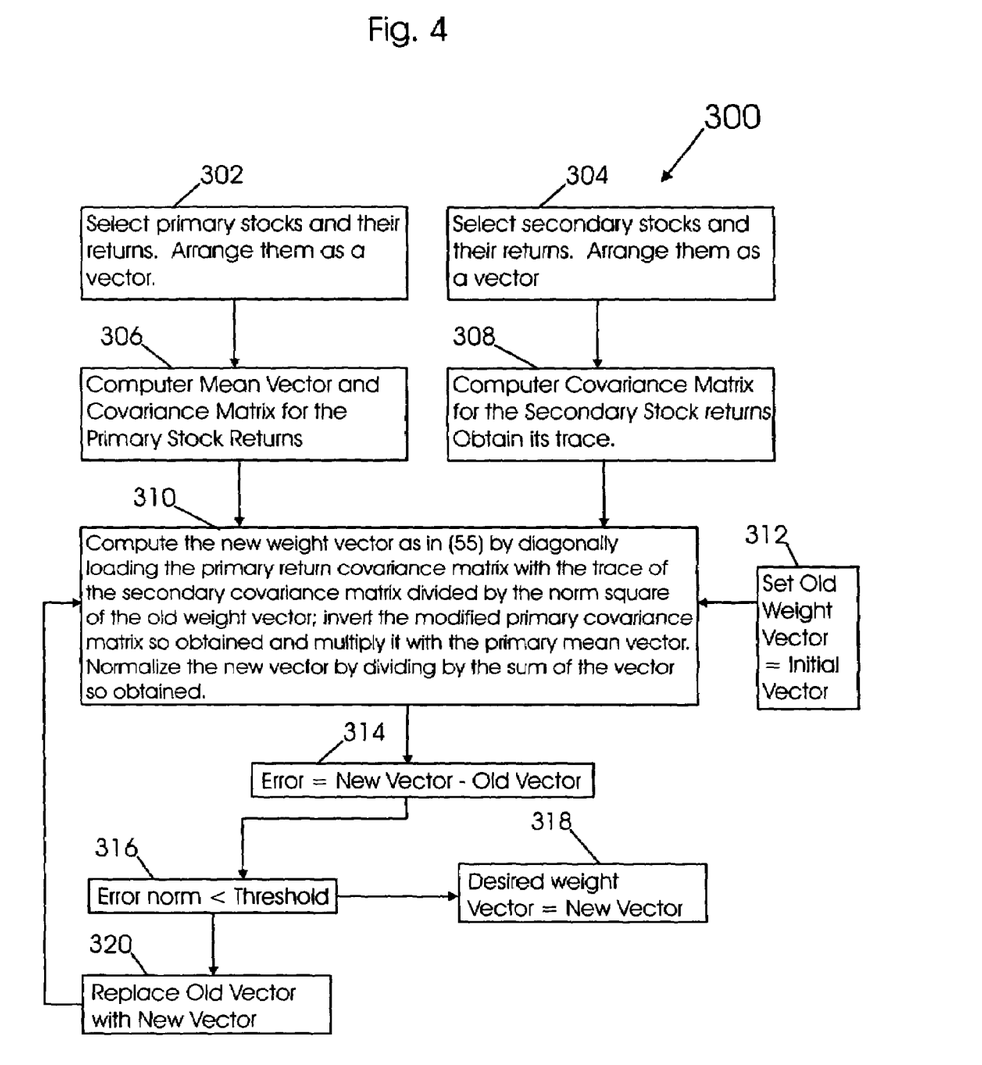
FIG. 4 shows a flow chart of another method in accordance with another embodiment of the present invention.

FIG. 4 shows a flow chart 300 of a method in accordance with an embodiment of the present invention. At step 302, a stock returns vector, such as $\underline{r}(n)$ calculated by equation (3) and (7), is determined for m primary stocks and at step 304 another stock returns vector is calculated for a certain number of secondary stocks in a similar manner. Next, at step 306 a means of returns vector, such as $\underline{\mu}$ is calculated by equation (4) and (8), and a covariance matrix R is computed as in equation (10) for the primary stocks, and at step 308 a covariance matrix $R_0$ for the secondary stocks is computed similar to equation (10). Equation (49) is used to determine the trace of the secondary returns $\sigma_o^2$ at step 310. Next at step 312, an initial starting vector is determined, which becomes the old vector $\underline{a}_k$ at step 312 to start the iteration, and determine the norm of $\|\underline{a}_k\|^2$ as in equation (52). At step 310, a modified inverse covariance matrix such as $$\left(R + \frac{\sigma_0^2}{\|\underline{a}_k\|^2} I\right)^{-1}$$

is determined. At step 310 weighting factors, such as the new vector $\underline{a}_{k+1}$ are determined based on the above modified inverse covariance matrix times the means for primary returns vectors divided by the sum of the new vector entries so obtained, such as by equations (54) or (55). At step 314, the difference of the new vector $\underline{a}_{k+1}$ and old vector $\underline{a}_k$ is defined as the error vector. At step 316 the error norm is computed as in equation (52) for the error vector, and it is compared with a predetermined threshold value, such as for example 0.001 etc. If the error norm is less than the preset threshold value, the new vector obtained at step 310 is taken as the desired weighing factors at step 318. Otherwise, the old vector is replaced with the contents of the new vector at step 320 and it is fed back to step 310, where the entire cycle is repeated till the desired accuracy is achieved.

Optimum Nonnegative Solution: Interestingly, it is possible to guarantee the solution given by equations (54)-(55) to be nonnegative by treating $\sigma_o^2$ in equations (54)-(55) as a free parameter. Recall that $\sigma_o^2$ represents a measure of the effect of the correlation of the secondary stocks on the primary stocks, and for a given value of $\sigma_o^2$, the optimum vector in (54) can have both positive and negative entries. In such situations, by increasing the value of $\sigma_o^2$ the optimum vector can be made nonnegative there by avoiding short sales. In fact, for any given covariance matrix R and nonnegative vector $\underline{\mu}$, there exists a minimum positive value for the constant $\sigma_o^2$ in the equation $$\underline{a} = (R + \sigma_0^2 I)^{-1} \underline{\mu} \quad (56)$$

for which the vector $\underline{a}$ becomes nonnegative. The proof follows by expanding equation (56) and noticing that as the constant $\sigma_o^2$ becomes large, the perturbation terms to the first term $\underline{\mu}$ in the expansion become of decreasing importance, and hence the vector $\underline{a}$ becomes nonnegative. Using this approach in equations (54)-(55), it follows that there exists a minimum threshold value for the sympathetic stocks' variance term $\sigma_o^2$, above which the optimum vector $\underline{b}_{opt}$ remains non-negative. Using any value above this threshold value for $\sigma_o^2$ in equations (54)-(55) avoids short sales for the optimum portfolio mixing strategy. To determine this threshold value, one may proceed using the iterative steps in FIG. 4 where the term $\sigma_o^2$ is treated as a free parameter. For a preset value of $\sigma_o^2$ if the final weight factor vector at stage step 318 in FIG. 4 turns out to have negative entries, the whole process is repeated with a larger value for the preset term $\sigma_o^2$ until all entries of the weight vector factor at step 318 turns out to be positive.

As an example, consider a portfolio containing three stocks whose 3×3 covariance matrix is give by $$R = \begin{pmatrix} 1.0 & 0.40 & -0.25 \\ .40 & 0.80 & -.30 \\ -0.25 & -0.30 & 2.0 \end{pmatrix} \quad (57)$$

and let $\mu=(0.20\ 0.50\ 0.40)^T$ represent their the expected return values vector. In that case the solution in equation (33) that maximizes the overall gain to risk ratio is given by $R^{-1}\mu=(-0.237\ 0.7531\ 0.310)^T$ and it has one negative entry and hence it involves short sales. However using $\sigma_o^2=0.034995$, the solution in (56) after normalization turns out to be $\underline{a}=(0.0000025\ 0.683533\ 0.293664)^T$. Since the new solution has all nonnegative entries, it avoids short sales. Using any other value above this threshold for $\sigma_o^2$ results in all positive values for the solution and it avoids short sales in the optimum portfolio.

In summary, methods in accordance with embodiments of the present invention for determining the optimization strategies for building a new portfolio mixing vector are disclosed. In at least most if not all of these cases, the ratio of the overall portfolio gain function to the portfolio risk is maximized, where the definition of the portfolio risk is extended in one case to include the influence of stocks that are sympathetic to the primary stocks of interest. If short selling stocks is allowed, the above strategies can be applied to any set of stocks; if short selling is not permitted, then the selection of stocks and their number that goes into the actual portfolio becomes important and it must be accomplished so as to maintain the desired portfolio mixing vector to be positive, while maintaining a high yield (gain) with minimum fluctuations (risk). This can also be accomplished by extending the definition of risk to include a free variable term that denotes the effect of a secondary set of stocks, and by increasing this term the desired portfolio mixing vector can be made positive through an iterative procedure.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising
    determining a first return value for a first stock;
    determining a second return value for the first stock;
    determining a mean return value for the first stock based on averaging the first and second return values for the first stock;
    determining a first return value for a second stock; determining a second return value for the second stock;
    determining a mean return value for the second stock based on averaging the first and second return values for the second stock;
    determining a co-variance matrix and its inverse based on the first and second return values for the first stock, the mean return value for the first stock, the first and second return values for the second stock, and the mean return value for the second stock;
    determining by a computer weight factors for the first and second stocks, respectively, by multiplying the inverse co-variance matrix times the mean return values for the first and second stocks; and normalizing them by dividing them by their sum;
    specifying a first amount for purchasing of the first stock based on the first weight factor; and
    specifying a second amount for purchasing of the second stock based on the second weight factor.

2. The method of claim 1
    purchasing the first stock using the first amount; and
    purchasing the second stock using the second amount.

3. A method comprising
    selecting a primary set of investments; selecting a secondary set of investments which are related to the primary set of investments;
    determining returns for the primary set of investments;
    determining returns for the secondary set of investments;
    determining an expected mean returns vector for the primary set of investments;
    determining a covariance matrix for the primary set of investments;
    modifying the covariance matrix for the primary set of investments by adding a diagonal matrix generated from a covariance matrix for the secondary set of investments; and
    determining by a computer weighting factors $\underline{a}$ for investing in the primary set of investments iteratively from the below fraction:

$$\underline{a}_{k+1} = \frac{\left(R+\frac{\sigma_0^2}{\|\underline{a}_k\|^2}I\right)^{-1}\mu}{\underline{e}^T\left(R+\frac{\sigma_0^2}{\|\underline{a}_k\|^2}I\right)^{-1}\mu},$$

wherein R is the covariance matrix for the primary set of investments, $\mu$ is the expected mean returns vector for the primary set of investments, $\underline{e}^T$ is an all ones row vector; $\sigma_o^2$ is a scalar function generated from a covariance matrix of the secondary set of investments, to modify the covariance matrix for the primary set of investments by adding it to the diagonal entries of the covariance matrix of the primary set of investments.

4. The method of claim 3 wherein
the scalar function generated from the covariance matrix of the secondary set of investments is a trace of the covariance matrix of the secondary set of investments.

5. The method of claim 3 wherein
if short selling is not allowed, determining the weighting factors by treating $\sigma_o^2$ as a free variable this time, incrementally increasing this free variable $\sigma_o^2$ until all of the weighting factors become positive after a desired number of iterations.

6. The method of claim 3 wherein
the primary set of investments includes a plurality of mutual funds.

7. The method of claim 3 wherein
the primary set of investments includes a plurality of hedge funds.

8. The method of claim 3 wherein
the primary set of investments includes a plurality of index funds.

9. The method of claim 3 wherein
the primary set of investments includes a number of investments;
wherein the number of investments in the primary set of investments is a free variable that can be used to fulfill a nonnegativity condition for the vector of weighting factors.

10. A method comprising
    selecting a primary set of investments; determining a returns vector for the primary set of investments;
    determining an expected mean returns vector for the primary set of investments;
    determining a covariance matrix for the primary set of investments;

determining by a computer a vector of weighting factors $\underline{a}_{opt}$ for the primary set of investments, wherein:

$$a_{opt} = \frac{R^{-1}\underline{\mu}}{\underline{e}^T R^{-1}\underline{\mu}}$$

wherein $R^{-1}$ is the inverse of the covariance matrix for the primary set of investments, $\underline{\mu}$ is the expected mean returns vector for the primary set of investments, and $\underline{e}^T$ is the transpose of an all ones vector; and further comprising specifying amounts of the primary set of investments to purchase based on the weighting factors.

11. The method of claim 10 wherein
the primary set of investments includes a plurality of mutual funds.

12. The method of claim 10 wherein
the primary set of investments includes a plurality of hedge funds.

13. The method of claim 10 wherein
the primary set of investments includes a plurality of index funds.

14. The method of claim 10 wherein
if short selling is not allowed, further comprising selecting the primary set of investments from a large pool of available stocks or securities so that the inverse of the covariance for the primary set of investments is a nonnegative matrix, with all entries being nonnegative numbers.

15. The method of claim 10 wherein
If short selling is not allowed, further comprising selecting the primary set of investments from a large pool of available stocks or securities in such a way that, for a given positive vector $\underline{\mu}$ that represents the expected mean value for the period of investment of the returns for the primary set of investments so selected, the vector $R^{-1}\underline{\mu}$ must have all nonnegative entries.

16. The method of claim 10 wherein
the primary set of investments includes a number of investments;
wherein the number of investments in the primary set of investments is a free variable that can be used to fulfill a nonnegativity condition for the vector of weighting factors.

17. An apparatus comprising
a computer processor; and
wherein the computer processor is programmed to
receive an identification of a primary set of investments;
determine a returns vector for the primary set of investments;
determine an expected mean returns vector for the primary set of investments;
determine a covariance matrix for the primary set of investments;
determine a vector of weighting factors $\underline{a}_{opt}$ for the primary set of investments, wherein:

$$a_{opt} = \frac{R^{-1}\underline{\mu}}{\underline{e}^T R^{-1}\underline{\mu}}$$

wherein $R^{-1}$ is the inverse of the covariance matrix for the primary set of investments, $\underline{\mu}$ is the expected mean returns vector for the primary set of investments, and $\underline{e}^T$ is an all ones row vector; and
and wherein the computer processor is further programmed to specify amounts of the primary set of investments to purchase based on the weighting factors.

18. An apparatus comprising
a computer processor;
and wherein the computer processor is programmed to
receive an identification of a primary set of investments;
select a secondary set of investments which are related to the primary set of investments;
determine returns for the primary set of investments;
determine returns for the secondary set of investments;
determine an expected mean returns vector for the primary set of investments;
determine a covariance matrix for the primary set of investments;
determine a covariance matrix for the secondary set of investments;
modify the covariance matrix for the primary set of investments by adding a diagonal matrix generated from the covariance matrix for the secondary set of investments; and
determine weighting factors $\underline{a}$ for investing in the primary set of investments iteratively from the below fraction:

$$a_{k+1} = \frac{\left(R + \frac{\sigma_0^2}{\|a_k\|^2}I\right)^{-1}\underline{\mu}}{\underline{e}^T\left(R + \frac{\sigma_0^2}{\|a_k\|^2}I\right)^{-1}\underline{\mu}},$$

wherein R is the covariance matrix for the primary set of investments, $\underline{\mu}$ is the expected mean returns vector for the primary set of investments, $\underline{e}^T$ is an all ones row vector; $\sigma_o^2$ is a scalar function generated from the covariance matrix of the secondary set of investments, to modify the covariance matrix for the primary set of investments by adding it to the diagonal entries of the covariance matrix of the primary set of investments; and
wherein the computer processor is further programmed to specify amounts of each of the investments of the primary set of investments to purchase based on the weighting factors.

19. The apparatus of claim 18 wherein
the scalar function generated from the covariance matrix of the secondary set of investments is a trace of the covariance matrix of the secondary set of investments.

* * * * *